United States Patent
Yang et al.

(10) Patent No.: US 12,423,848 B2
(45) Date of Patent: Sep. 23, 2025

(54) METHOD FOR GENERATING DEPTH IN IMAGES, ELECTRONIC DEVICE, AND NON-TRANSITORY STORAGE MEDIUM

(71) Applicant: HON HAI PRECISION INDUSTRY CO., LTD., New Taipei (TW)

(72) Inventors: Jung-Hao Yang, New Taipei (TW); Chih-Te Lu, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 362 days.

(21) Appl. No.: 18/097,080

(22) Filed: Jan. 13, 2023

(65) Prior Publication Data
US 2023/0386063 A1    Nov. 30, 2023

(30) Foreign Application Priority Data
May 24, 2022 (CN) .......................... 202210570782.7

(51) Int. Cl.
G06T 7/593 (2017.01)
G06V 10/80 (2022.01)
H04N 13/106 (2018.01)

(52) U.S. Cl.
CPC ............ *G06T 7/593* (2017.01); *G06V 10/803* (2022.01); *H04N 13/106* (2018.05); *G06T 2207/20081* (2013.01); *G06T 2207/20228* (2013.01)

(58) Field of Classification Search
CPC ........... G06T 7/593; G06T 2207/20081; G06T 2207/20228; G06T 2207/10012;
(Continued)

(56) References Cited

U.S. PATENT DOCUMENTS

| 9,414,048 B2 * | 8/2016 | Karsch ................. H04N 13/261 |
| 10,991,150 B2 * | 4/2021 | Elgharib ............... G06T 15/205 |

(Continued)

FOREIGN PATENT DOCUMENTS

| CN | 110443843 A | 11/2019 |
| CN | 111259945 A | 6/2020 |

(Continued)

OTHER PUBLICATIONS

X. Xiong, Z. Cao, C. Zhang, K. Xian and H. Zou, "Binoboost: Boosting Self-Supervised Monocular Depth Prediction with Binocular Guidance," 2019 IEEE International Conference on Image Processing (ICIP), Taipei, Taiwan, 2019, pp. 1770-1774, (Year: 2019).*

(Continued)

*Primary Examiner* — Kathleen Y Dulaney
(74) *Attorney, Agent, or Firm* — ScienBiziP, P.C.

(57) ABSTRACT

A method and system for generating depth in monocular images acquires multiple sets of binocular images to build a dataset containing instance segmentation labels as to content; training an work using the dataset with instance segmentation labels to obtain a trained autoencoder network; acquiring monocular image, the monocular image is input into the trained autoencoder network to obtain a first disparity map and the first disparity map is converted to obtain depth image corresponding to the monocular image. The method combines binocular images with instance segmentation images as training data for training an autoencoder network, monocular images can simply be input into the autoencoder network to output the disparity map. Depth estimation for monocular images is achieved by converting the disparity map to a depth image corresponding to the monocular image. An electronic device and a non-transitory storage are also disclosed.

15 Claims, 5 Drawing Sheets

(58) Field of Classification Search
CPC ... G06T 2207/20084; G06T 7/50; G06T 9/00; G06V 10/803; G06V 20/64; G06V 10/26; G06V 10/806; G06V 10/82; G06V 10/764; G06V 10/774; H04N 13/106; H04N 13/239; H04N 13/271; H04N 2013/0081; Y02T 10/40
USPC .................................................. 382/154, 159
See application file for complete search history.

(56) References Cited

U.S. PATENT DOCUMENTS

| | | | |
|---|---|---|---|
| 11,488,392 B2* | 11/2022 | Chen | G06V 20/58 |
| 2019/0295282 A1* | 9/2019 | Smolyanskiy | G01S 13/867 |
| 2019/0325597 A1* | 10/2019 | Chakravarty | H04N 13/289 |
| 2020/0041276 A1* | 2/2020 | Chakravarty | G01C 21/3848 |
| 2020/0074661 A1* | 3/2020 | Anisimovskiy | G06T 3/02 |
| 2020/0090359 A1* | 3/2020 | Pillai | G06V 10/82 |
| 2020/0202548 A1* | 6/2020 | Wang | G06V 10/82 |
| 2020/0226773 A1* | 7/2020 | Gan | G06N 3/088 |
| 2020/0351489 A1* | 11/2020 | Watson | G06N 20/00 |
| 2021/0117704 A1* | 4/2021 | Yao | G06T 7/73 |
| 2021/0256717 A1* | 8/2021 | Lin | G06T 7/136 |
| 2022/0036573 A1* | 2/2022 | Kim | G06N 7/01 |
| 2022/0130062 A1* | 4/2022 | Bhutani | G06N 3/08 |
| 2022/0156971 A1* | 5/2022 | Guizilini | G06T 7/74 |
| 2022/0164582 A1* | 5/2022 | Raghavan | G06F 18/2115 |
| 2022/0198690 A1* | 6/2022 | Yao | G06T 7/50 |
| 2022/0217320 A1* | 7/2022 | Maleki | H04N 13/261 |
| 2022/0277489 A1* | 9/2022 | Ali | G06T 7/80 |
| 2022/0383530 A1* | 12/2022 | Giryes | G03B 35/08 |
| 2023/0196690 A1* | 6/2023 | Watson | G06T 19/006 345/633 |
| 2023/0248452 A1* | 8/2023 | Levine | G06T 5/60 600/114 |
| 2023/0386223 A1* | 11/2023 | Oh | G06V 20/588 |
| 2023/0401733 A1* | 12/2023 | Kuo | G06T 7/55 |
| 2024/0090846 A1* | 3/2024 | Lee | A61B 5/0077 |
| 2024/0221371 A1* | 7/2024 | Kanazawa | G06N 3/096 |

FOREIGN PATENT DOCUMENTS

| | | |
|---|---|---|
| CN | 111325782 | 6/2020 |
| CN | 114332187 | 4/2022 |

OTHER PUBLICATIONS

M. Poggi, F. Tosi and S. Mattoccia, "Learning Monocular Depth Estimation with Unsupervised Trinocular Assumptions," 2018 International Conference on 3D Vision (3DV), Verona, Italy, 2018, pp. 324-333 (Year: 2018).*

C. Godard, O. M. Aodha and G. J. Brostow, "Unsupervised Monocular Depth Estimation with Left-Right Consistency," 2017 IEEE Conference on Computer Vision and Pattern Recognition (CVPR), Honolulu, HI, USA, 2017, pp. 6602-6611, (Year: 2017).*

Garg et al, "Unsupervised CNN for Single View Depth Estimation: Geometry to the Rescue" European Conference on Computer Vision, 2016 (Year: 2016).*

* cited by examiner

METHOD FOR GENERATING DEPTH IN IMAGES, ELECTRONIC DEVICE, AND NON-TRANSITORY STORAGE MEDIUM

TECHNICAL FIELD

The subject matter herein generally relates to image processing.

BACKGROUND

Deep learning networks developed from machine learning technology, are applied to many real-word scenarios, such as autonomous driving. In these application, predictions are very important. If unpredicted pixels appear in very important areas, such as those of smaller obstacles, it may cause failure of the avoidance system.

Thus, depth estimation is a key technology to be solved in deep learning. The specific task of depth estimation refers to predicting the depth of each pixel in a picture. The image composed of the depth values of each pixel is also called a depth map. Depth estimation is of great significance for obstacle detection, 3D scene reconstruction, and stereo analysis of a scene in autonomous driving but binocular cameras are expensive and complicated.

BRIEF DESCRIPTION OF THE DRAWINGS

Implementations of the present disclosure will now be described, by way of embodiments, with reference to the attached figures.

DETAILED DESCRIPTION

Figure 1:
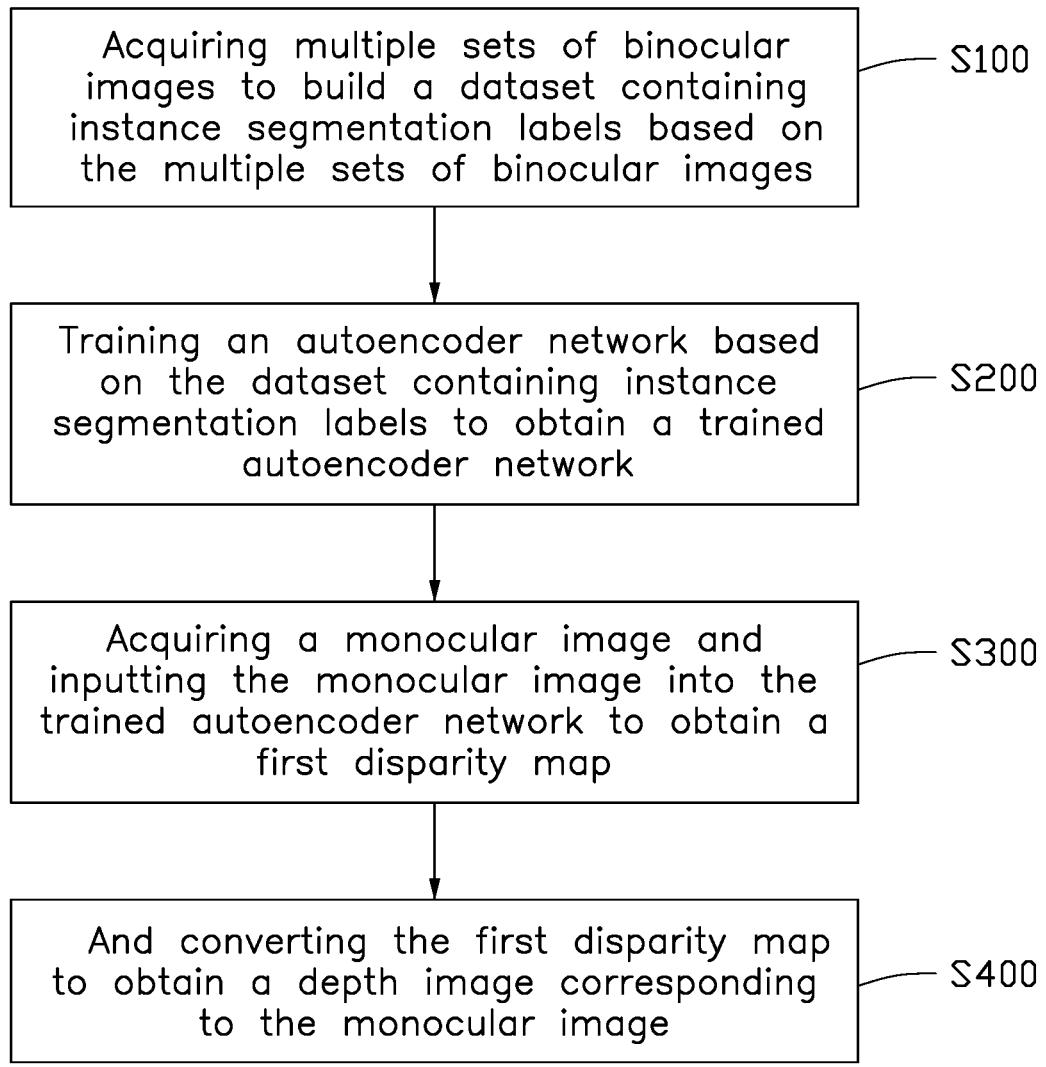
FIG. 1 is a flowchart of an embodiment of a method for generating depth in images according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The connection can be such that the objects are permanently connected or releasably connected. The term "comprising," when utilized, means "including, but not necessarily limited to"; it specifically indicates open-ended inclusion or membership in the so-described combination, group, series, and the like.

The depth image generation method is applied in one or more electronic devices which can compute. The hardware may be but is not limited to Microprogrammed Control Unit, Application Specific Integrated Circuit, Field-Programmable Gate Array, Digital Signal Processor, and embedded devices, etc.

FIG. 1 illustrates one exemplary embodiment of the method. The flowchart presents an exemplary embodiment of the method. The exemplary is provided by way of example, as there are a variety of ways to carry out the method. Each block shown in FIG. 1 may represent one or more processes, methods, or subroutines, carried out in the example method. Furthermore, the illustrated order of block is illustrative only and the order of the blocks can change. Additional blocks can be added or fewer blocks may be utilized, without departing from this disclosure. The example method can be begin at block S100.

In block S100, multiple sets of binocular images are acquired to build a dataset containing instance segmentation labels based on the multiple sets of binocular images.

In one embodiment, binocular images can be original binocular images. The original binocular images can be images that are directly captured by an image acquisition device. For example, a camera is an image acquisition device.

In one embodiment, the multiple sets of binocular images can also be obtained from a storage device. For example, a storage device is a U disk, etc. . . . The multiple sets of binocular images can also be obtained from a website server through a network.

In one embodiment, instance segmentation may comprise multiple instances of the same category in images and may need to be distinguished. For example, an image may comprise a number of people. In the instance segmentation, it is necessary to distinguish each person, and each person can be added under a corresponding instance segmentation label. The instance segmentation label of the binocular images can be obtained by segmenting the binocular images. A data set containing instance segmentation labels can be obtained by the instance segmentation labels of the binocular images.

In block S200, an autoencoder network is trained based on the dataset containing instance segmentation labels to obtain a trained autoencoder network.

Figure 2:
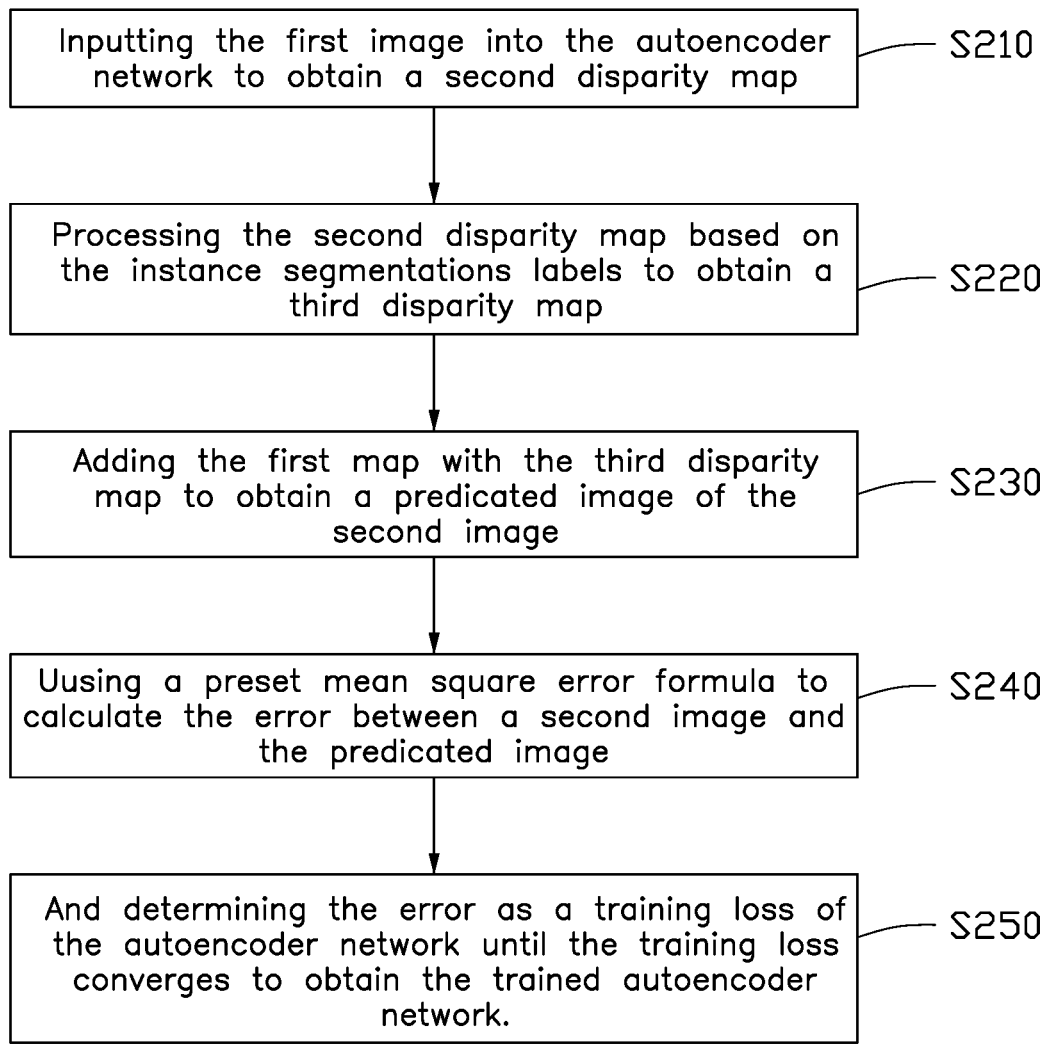
FIG. 2 is a segmented process diagram of one block of the depth image generation method as shown in FIG. 1.

In one embodiment, the autoencoder network is trained by a dataset. The dataset can be established based on the multiple sets of binocular images containing instance segmentation labels. This produces better training results, and training methods of the autoencoder network are shown in FIG. 2.

In block S300, a monocular image without a depth characteristic (M-image) is acquired, and the monocular image is input into the trained autoencoder network to obtain a first disparity map.

In one embodiment, in current use, an M-image can be obtained by a monocular camera, and the monocular image can be images of any scene.

The sampling date of the autoencoder network comes from binocular images, so it can improve the accuracy of depth prediction when the disparity of binocular images is used to guide the depth prediction of M-images.

In block S400, the first disparity map is converted to obtain a depth image corresponding to the M-image.

In one embodiment, after the M-image is obtained, the M-image is input into the trained autoencoder network, and a first disparity map corresponding to the M-image is output by the autoencoder network, a depth image cannot be output by the autoencoder network. Therefore, it is also necessary to convert the first parallax image according to the first parallax image output by the autoencoder network, the baseline distance of the lens of the monocular camera shooting the M-image, and the focal length of the monocular camera shooting the M-image being obtained. Thus the depth image corresponding to the determined M-image is obtained.

Referring to FIG. 2, each set of binocular images in multiple sets of binocular images comprises a first image and a second image, and an autoencoder network can be trained by the following blocks:

In block S210, the first image is input into the autoencoder network to obtain a second disparity map.

In block S220, the second disparity map is processed based on the instance segmentation label to obtain a third disparity map.

In one embodiment, the processed image can be generated based on the instance segmentation label. Based on the processed image as the guidance of the processed mechanism, the second disparity map is fused and corrected to obtain a finer third disparity map.

In block S230, the first map is added with the third disparity map to obtain a predicated image of the second image.

In block S240, the error between a second image and the predicated image is calculated by using the preset mean square error formula.

In one embodiment, the preset mean square error formula is:

$$MSE = \frac{1}{n}\sum_{i=1}^{n}(y_i - \hat{y}_i)^2$$

wherein 'MSE' is the mean square error between the predicated image and the second image, $y_i$ is an i-th pixel point of the second image, $\hat{y}_i$ is an average pixel value of the second image, and n is the number of pixels of the second image.

In block S250, the error is confirmed as a training loss of the autoencoder network until these is convergence in the training losses, to obtain the trained autoencoder network.

In one embodiment, the first image can be a left image of the binocular images, and the second image can be a right image of the binocular images. In other embodiments, the first image can be a right image of the binocular images, and the second image can be a left image of the binocular images. In other words, the disparity map can be the disparity map corresponding to the left view based on the left view, or the disparity map corresponding to the right view based on the right view. This is not limited in any embodiment.

The training sample data of the autoencoder network in this application comes from the binocular images containing the instance segmentation label, that is to say, this application uses binocular parallax to guide the prediction of M-image depth. Therefore, the depth image generation method does not require a large amount of data and labeling and a better training effect is achieved.

Figure 3:
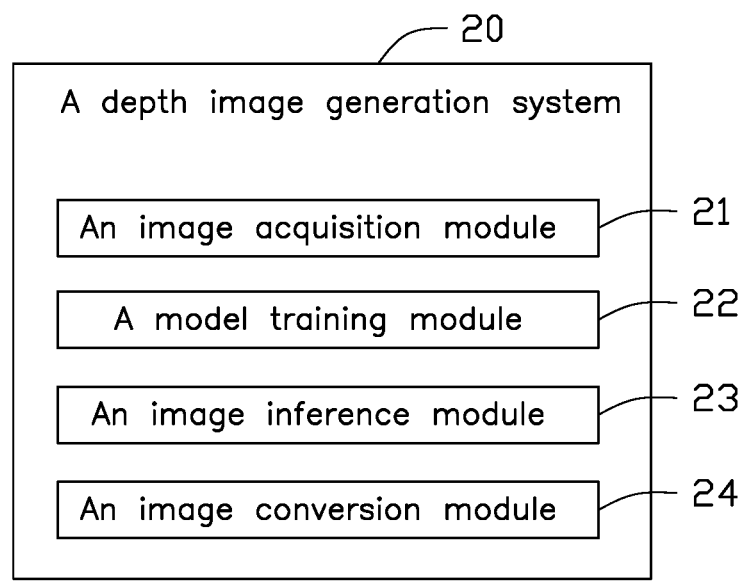
FIG. 3 shows function modules of a depth image generation system.

Referring to FIG. 3, the application also provides a depth image generation system 20 by the idea of object detection method based on monocular camera in above embodiment. The depth image generation system 20 can perform the above object detection method using monocular camera. Only the parts related to the implementation of this application in the function module diagram of the depth image generation system 20 are shown. Persons of skill in the art can understand that the graphic structure is not limited to the depth image generation system 20. The graphic structure can comprise more or less components than the diagram, or combine some components, or have different component arrangements.

Specifically, in one embodiment, the depth image generation system 20 can be applied to electronic devices. The depth image generation system 20 can comprise an image acquisition module 21. The image acquisition module 21 acquires multiple sets of binocular images to build a dataset containing instance segmentation labels based on multiple sets of binocular images; and a model training module 22, the model training module 22 trains an autoencoder network by using the dataset with instance segmentation labels to obtain a trained autoencoder network; an image inference module 23 acquires an M-image, wherein the M-image is input into the trained autoencoder network to obtain a first disparity map; an image conversion module 24 converts the first disparity map to obtain the depth image corresponding to the M-image.

Figure 4:
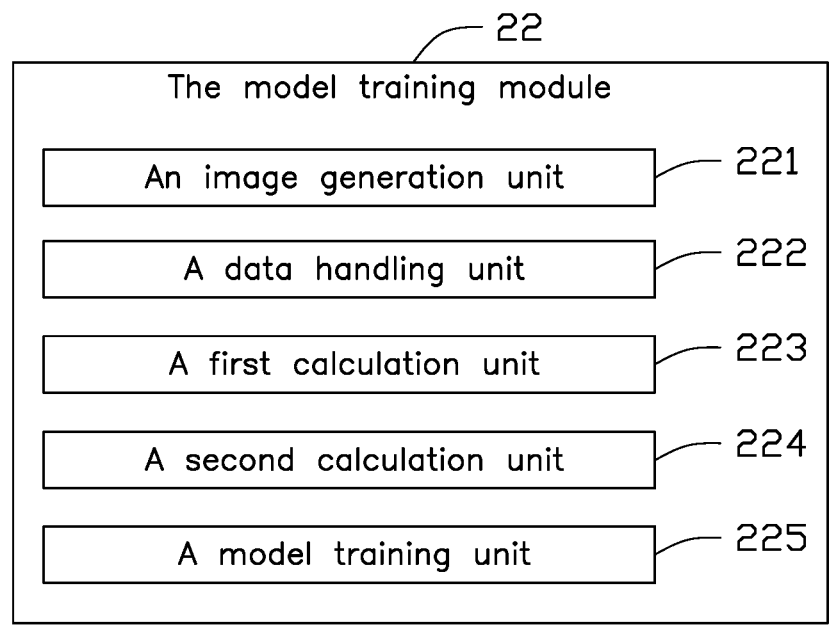
FIG. 4 is a segmented process diagram of the function modules in the depth image generation system as shown in FIG. 3.

In one embodiment, each set of the multiple sets of binocular images comprises the first image and the second image. FIG. 4 shows that the model training module 22 can comprise: an image generation unit 221, and the image generation unit 21 inputs the first image into the autoencoder network to obtain the second disparity map; a data handling unit 222, and the data handling unit 222 processes the second disparity map by using the instance segmentation label to obtain a third disparity map; a first calculation unit 223, and the first calculation unit 223 adds the first map with the third disparity map to obtain a predicated image of the second image; a second calculation unit 224, and the second calculation unit 224 uses the preset MSE formula to calculate the error between the second image and the predicated image; a model training unit 225, and the model training unit 225 confirms the error as the training loss of the autoencoder network until the training loss converges to obtain a trained autoencoder network.

Figure 5:
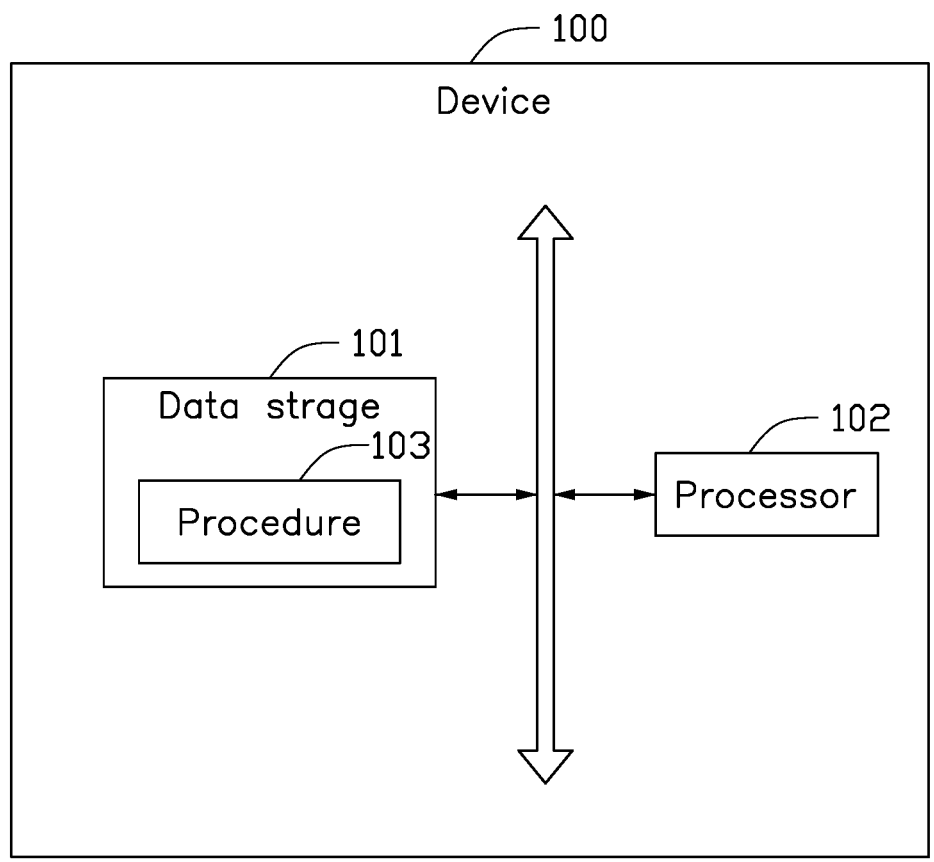
FIG. 5 shows architecture of electronic device in one embodiment.

In one embodiment, as shown in FIG. 5, the electronic device 100 further comprises a data storage 101. The data storage 101 stores a procedure 103, the procedure 103 may comprise a plurality of computer codes, the computer codes may include commands that can be executed by the processor 102 in implementing the method and system. For example, the processor 102 can execute the computer codes to achieve the object location method described in FIG. 1 or FIG. 2.

In one embodiment, the data storage 101 can be in the electronic device 100, or can be a separate external memory card, such as an SM card (Smart Media Card), an SD card (Secure Digital Card), or the like. The data storage 101 can include various types of non-transitory computer-readable storage mediums. For example, the data storage 101 can be an internal storage system, such as a flash memory, a random access memory (RAM) for temporary storage of information, and/or a read-only memory (ROM) for permanent storage of information. The data storage 101 can also be an external storage system, such as a hard disk, a storage card, or a data storage medium. The processor 102 can be a central processing unit (CPU), a microprocessor, or other data processor chip that performs functions of the electronic device 100.

In one embodiment, a non-transitory storage medium having stored thereon instructions is also disclosed. When the computer instruction is executed by a processor 102 of an electronic device 100, the electronic device 100 can perform the depth image generation method.

The embodiments shown and described above are only examples. Many details known in the field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A depth image generation method, comprising:
   acquiring multiple sets of binocular images to build a dataset containing instance segmentation labels based on the multiple sets of binocular images;
   training an autoencoder network based on the dataset containing instance segmentation labels to obtain a trained autoencoder network;
   acquiring a monocular image and inputting the monocular image into the trained autoencoder network to obtain a first disparity map; and
   converting the first disparity map to obtain a depth image corresponding to the monocular image;
   wherein each set of the multiple sets of binocular images comprises a first image and a second image, training the autoencoder network based on the dataset containing instance segmentation labels to obtain the trained autoencoder network comprises:
   inputting the first image of one set of the multiple sets of binocular images into the autoencoder network to obtain a second disparity map;
   processing the second disparity map based on the instance segmentations labels to obtain a third disparity map;
   adding the first image with the third disparity map to obtain a predicated image of the second image of the one set of the multiple sets of binocular images;
   using a preset mean square error formula to calculate the error between the second image of the one set of the multiple sets of binocular images and the predicated image; and
   determining the error as a training loss of the autoencoder network until the training loss converges to obtain the trained autoencoder network.

2. The depth image generation method of claim 1, wherein processing the second disparity map based on the instance segmentation labels to obtain the third disparity map comprises:
   generating a processed image based on the instance segmentation labels; and fusing and correcting the second disparity map based on the processed image to obtain the third disparity map.

3. The depth image generation method of claim 1, wherein the preset mean square error formula comprises:

$$MSE = \frac{1}{n}\sum_{i=1}^{n}(y_i - \hat{y}_i)^2$$

wherein 'MSE' is the mean square error between the predicated image and the second image of the one set of the multiple sets of binocular images, $y_i$ is an i-th pixel point of the second image of the one set of the multiple sets of binocular images, $\hat{y}_i$ is an average pixel value of the second image of the one set of the multiple sets of binocular images, and n is the number of pixels of the second image of the one set of the multiple sets of binocular images.

4. The depth image generation method of claim 1, wherein the first image of the one set of the multiple sets of binocular images is a left image of the binocular images and the second image of the one set of the multiple sets of binocular images is a right image of the binocular images.

5. The depth image generation method of claim 1, wherein the first image of the one set of the multiple sets of binocular images is a right image of the binocular images and the second image of the one set of the multiple sets of binocular images is a left image of the binocular image.

6. An electronic device, comprising:
   at least one processor; and
   a data storage storing one or more programs which when executed by the at least one processor, cause the at least one processor to:
   acquire multiple sets of binocular images to build a dataset containing instance segmentation labels based on the multiple sets of binocular images;
   train an autoencoder network based on the dataset containing instance segmentation labels to obtain a trained autoencoder network;
   acquire a monocular image and input the monocular image into the trained autoencoder network to obtain a first disparity map; and
   convert the first disparity map to obtain a depth image corresponding to the monocular image;
   wherein each set of the multiple sets of binocular images comprises a first image and a second image, training the autoencoder network based on the dataset containing instance segmentation labels to obtain the trained autoencoder network comprises:
   inputting the first image of one set of the multiple sets of binocular images into the autoencoder network to obtain a second disparity map;
   processing the second disparity map based on the instance segmentations labels to obtain a third disparity map;
   adding the first image with the third disparity map to obtain a predicated image of the second image of the one set of the multiple sets of binocular images;
   using a preset mean square error formula to calculate the error between the second image of the one set of the multiple sets of binocular images and the predicated image; and
   determining the error as a training loss of the autoencoder network until the training loss converges to obtain the trained autoencoder network.

7. The electronic device of claim 6, wherein processing the second disparity map based on the instance segmentation labels to obtain the third disparity map comprises:
   generating a processed image based on the instance segmentation labels; and fusing and correcting the second disparity map based on the processed image to obtain the third disparity map.

8. The electronic device of claim 6, wherein the preset mean square error formula comprises:

$$MSE = \frac{1}{n}\sum_{i=1}^{n}(y_i - \hat{y}_i)^2$$

wherein 'MSE' is the mean square error between the predicated image and the second image of the one set of the multiple sets of binocular images, $y_i$ is an i-th pixel point of the second image of the one set of the multiple sets of binocular images, $\hat{y}_i$ is an average pixel value of the second image of the one set of the multiple sets of binocular images, and n is the number of pixels of the second image of the one set of the multiple sets of binocular images.

9. The electronic device of claim 6, wherein the first image of the one set of the multiple sets of binocular images is a left image of the binocular images and the second image of the one set of the multiple sets of binocular images is a right image of the binocular images.

10. The electronic device of claim 6, wherein the first image of the one set of the multiple sets of binocular images is a right image of the binocular images and the second image of the one set of the multiple sets of binocular images is a left image of the binocular image.

11. A non-transitory storage medium having stored thereon instructions that, when executed by a processor of an electronic device, causes the electronic device to perform a depth image generation method, the depth image generation method comprising:

acquiring multiple sets of binocular images to build a dataset containing instance segmentation labels based on the multiple sets of binocular images;

training an autoencoder network based on the dataset containing instance segmentation labels to obtain a trained autoencoder network;

acquiring a monocular image and inputting the monocular image into the trained autoencoder network to obtain a first disparity map; and converting the first disparity map to obtain a depth image corresponding to the monocular image;

wherein each set of the multiple sets of binocular images comprises a first image and a second image, training the autoencoder network based on the dataset containing instance segmentation labels to obtain the trained autoencoder network comprises:

inputting the first image of one set of the multiple sets of binocular images into the autoencoder network to obtain a second disparity map;

processing the second disparity map based on the instance segmentations labels to obtain a third disparity map;

adding the first image with the third disparity map to obtain a predicated image of the second image of the one set of the multiple sets of binocular images;

using a preset mean square error formula to calculate the error between the second image of the one set of the multiple sets of binocular images and the predicated image; and determining the error as a training loss of the autoencoder network until the training loss converges to obtain the trained autoencoder network.

12. The non-transitory storage medium of claim 11, wherein processing the second disparity map based on the instance segmentation labels to obtain the third disparity map comprises:

generating a processed image based on the instance segmentation labels; and fusing and correcting the second disparity map based on the processed image to obtain the third disparity map.

13. The non-transitory storage medium of claim 11, wherein the preset mean square error formula comprises:

$$MSE = \frac{1}{n}\sum_{i=1}^{n}(y_i - \hat{y}_i)^2$$

wherein 'MSE' is the mean square error between the predicated image and the second image of the one set of the multiple sets of binocular images, $y_i$ is an i-th pixel point of the second image of the one set of the multiple sets of binocular images, $\hat{y}_i$ is an average pixel value of the second image of the one set of the multiple sets of binocular images, and n is the number of pixels of the second image of the one set of the multiple sets of binocular images.

14. The non-transitory storage medium of claim 11, wherein the first image of the one set of the multiple sets of binocular images is a left image of the binocular images and the second image of the one set of the multiple sets of binocular images is a right image of the binocular image.

15. The non-transitory storage medium of claim 11, wherein the first image of the one set of the multiple sets of binocular images is a right image of the binocular images and the second image of the one set of the multiple sets of binocular images is a left image of the binocular images.

\* \* \* \* \*